United States Patent [19]
Miura

[11] Patent Number: 5,185,822
[45] Date of Patent: Feb. 9, 1993

[54] FOCUSING STRUCTURE IN AN INFORMATION READING APPARATUS

[75] Inventor: Masaaki Miura, Tokyo, Japan

[73] Assignee: Asahi Kogaku Kogyo K.K., Tokyo, Japan

[21] Appl. No.: 751,667

[22] Filed: Aug. 23, 1991

Related U.S. Application Data

[63] Continuation of Ser. No. 367,413, Jun. 16, 1989, abandoned.

[30] Foreign Application Priority Data

Jun. 16, 1988 [JP] Japan .................. 63-148917

[51] Int. Cl.⁵ .............................................. G06K 7/10
[52] U.S. Cl. ...................................... 382/65; 382/69; 209/585
[58] Field of Search ............... 382/65, 69; 209/585; 358/227; 355/55, 57

[56] References Cited

U.S. PATENT DOCUMENTS

| | | | |
|---|---|---|---|
| 2,928,953 | 3/1960 | Bässler | 250/557 |
| 3,709,602 | 1/1973 | Satomi | 355/49 |
| 4,188,113 | 2/1980 | Hiraga | 355/51 |
| 4,268,165 | 5/1981 | Bradmon | 355/55 |
| 4,436,407 | 3/1984 | Satomi et al. | 355/11 |
| 4,544,064 | 10/1985 | Felder | 209/583 |
| 4,571,065 | 2/1986 | Yasuda | 355/11 |
| 4,709,147 | 11/1987 | Arai | 250/234 |
| 4,886,596 | 12/1989 | Sasage et al. | 209/539 |
| 5,117,256 | 5/1992 | Haibara | 355/77 |

FOREIGN PATENT DOCUMENTS

| | | | |
|---|---|---|---|
| 0111559 | 7/1982 | Japan | 355/55 |
| 0106531 | 6/1983 | Japan | 355/57 |

Primary Examiner—Leo H. Boudreau
Assistant Examiner—Andrew W. Johns
Attorney, Agent, or Firm—Sughrue, Mion, Zinn, Macpeak & Seas

[57] ABSTRACT

In an automatic sorting system for sorting objects conveyed on a conveyor, a camera is used for pattern recognition of the object being sorted. Due to the difference in sizes of the objects being sorted, the camera must be focused depending on the size of the object under consideration. Instead of moving the camera section itself, an optical path bending section can be included between the camera and the objects to be examined. The optical path bending section includes at least one pair of reflector mirrors disposed so that the reflecting surfaces thereof face each other at an angle of 90 degrees. In order to enable focusing for different sized objects, the optical path bending section can be moved in a direction parallel to the optical paths entering and exiting the optical path bending section.

11 Claims, 1 Drawing Sheet

FOCUSING STRUCTURE IN AN INFORMATION READING APPARATUS

This is a continuation of application Ser. No. 07/367,413, filed June 16, 1989.

BACKGROUND OF THE INVENTION

The present invention relates to focusing structure in an information reading apparatus that reads information on an object of interest (e.g., baggage or mail) and that is to typically be used with a sorting system which is capable of automatic sorting of the object of interest as it is conveyed on a conveyor.

Automatic sorting systems have been known which are capable of automatically sorting baggage, mail, etc., according to the address or point of destination as they are carried on a moving conveyor, etc. Using such an automatic sorting system, the address, point of destination or other information that is indicated on the surface of the object of interest is read using a reading apparatus disposed in the vicinity of the conveyor. The object on the conveyor is carried in one direction or another and collected there depending upon the information read. The object is thereby sorted in accordance with the address or point of its destination. The reading apparatus comprises a camera section that is composed of an optical system (lens), a sensor and an electric circuit, and an information processing section composed of a microcomputer. In the camera section, the image of the information indicating area formed on the focusing surface of the sensor by the lens is converted to an electric signal with the sensor, and the electric signal is supplied to the information processing section, which will then read the necessary information by pattern recognition or some other method in response to a signal from the camera section.

If the size of the object being conveyed is not uniform and the camera section is held at a fixed position, the distance from the information indicating area of the object to the camera section will vary and the image of that area will not properly be focused on the sensor to enable accurate reading of the necessary information. To avoid this problem, the camera section is adapted to be either automatically or manually movable so that the distance from the information indicating area of the object to the camera as measured with an instrument or the eye, respectively, is held constant.

The prior art reading apparatus however, has had the following problems. First, the camera section is composed of a highly precise optical system (lens), sensor and electric circuit and if the size of the object being conveyed is so uneven as to cause frequent change in the distance to the information indicating surface, the camera section must accordingly be moved frequently. As a result, troubles will often occur on account of vibrations or impacts caused by frequent moving and stopping of the camera, and this will markedly reduce the durability of the camera section. Secondly, there is a need to maximize the conveyor speed in order to improve the efficiency of sorting operations, but because of the low durability of the camera section and its high inertia due to its comparatively large mass, the camera section cannot by moved at a speed beyond a certain limit and the resulting limitation on the conveyor speed precludes improvement in the operational efficiency.

SUMMARY OF THE INVENTION

An object, therefore, of the present invention is to provide a focusing structure in an information reading apparatus that achieves focusing without moving the camera section, that has high durability and that can be operated with an increased conveyor speed.

In order to attain this object, the focusing structure of the present invention has an optical path bending section including at least one pair of reflector mirrors that are disposed in such a way that their reflecting surfaces face each other at an angle of 90 degrees. This optical path bending section is inserted in the optical path between the information indicating surface and the camera section in such a way that it is movable in a direction parallel to the optical paths entering and exiting the optical path bending section.

BRIEF DESCRIPTION OF THE DRAWINGS

Other features and advantages of the present invention will be apparent from the following description taken in connection with the accompanying drawings, wherein.

DETAILED DESCRIPTION OF THE INVENTION

Two embodiments of the present invention are described hereinafter with reference to the accompanying drawings.

Figure 1:
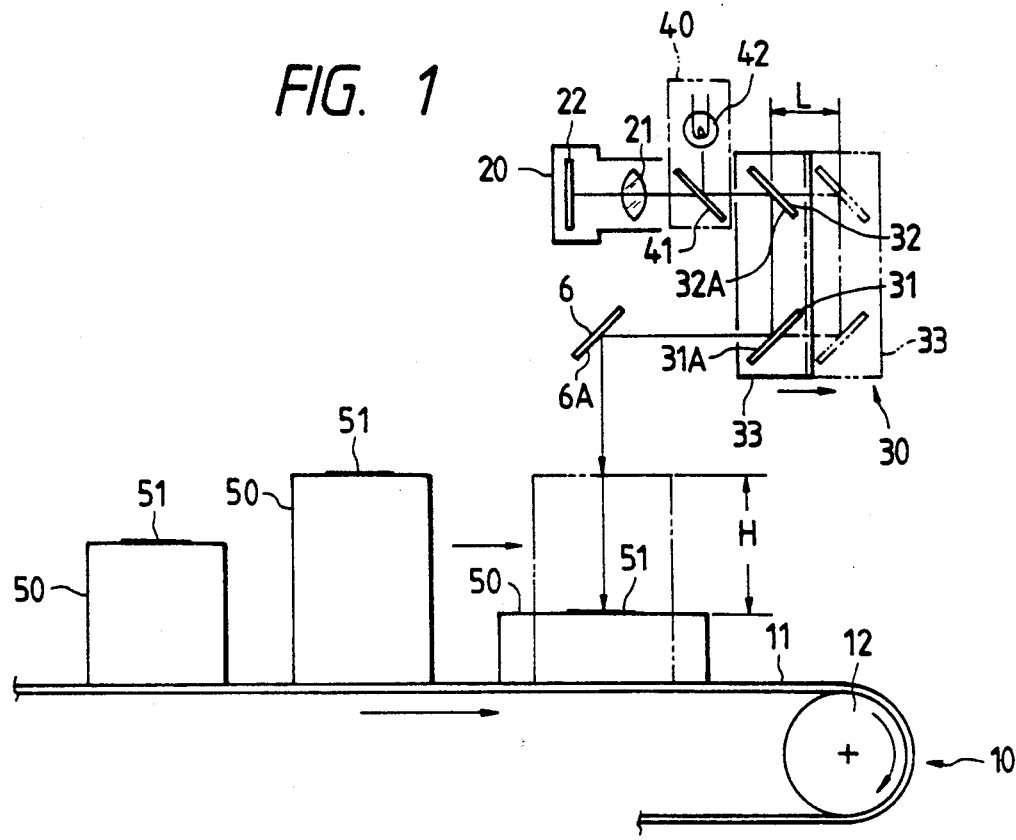
FIG. 1 is a diagram showing the concept of a focusing structure in an information reading apparatus according to a first embodiment of the present invention.

FIG. 1 is a diagram showing the concept of a focusing structure in the information reading section of an automatic sorting system. In the figure, reference numeral 10 is a conveyor, 50 is an object to be sorted which is carried on conveyor 10, 20 is a camera section, and 30 is a moving mirror unit in an optical path bending section.

An address or other pieces of information to be sorted are indicated on a sheet 51 that is attached to the top of the object 50 being carried on conveyor 10. Such information is read using camera section 20 and an information processing section (not shown) via a fixed mirror 6 and moving mirror unit 30. On the basis of the information thus read, the control section of the automatic sorting system conveys the object 50 in one direction or another according to its address or point of destination, and collects it for proper sorting.

The conveyor 10 is composed of an endless belt 11 that is stretched horizontally between rollers 12 and which goes around as the rollers 12 are rotatably driven by a suitable drive means (not shown). The object 50 placed on top of the belt 11 is conveyed horizontally in the direction indicated by the arrows shown in FIG. 1.

As already mentioned, the sheet 51 indicating the information necessary for sorting such as an address is attached to the top of the object 50 being carried by the conveyor 10.

The camera section 20 has a sensor 22 disposed at the focusing position of a lens 21. The distance between the lens 21 and the sensor 22 is held constant to provide a fixed focal point. The sensor 22 may be of a line sensor or area sensor type. If sensor 22 is designed as a line sensor, a plurality of line sensors composed of CCDs or the like are arrayed in a direction perpendicular to the movement of the image of object 50 formed by the lens 21. The information indicating surface (i.e., the surface of sheet 51) is scanned line by line as the object 50 moves. If sensor 22 is designed as an area sensor, the entire information indicating surface can be read at one time. Either type of sensor may be properly selected according to the specific use of the information reading system.

In the camera section 20, the lens 21 lies horizontally above the conveyor 10 (i.e., parallel to both the direction in which the object 50 is conveyed and the sheet 51) and is fixed at a position corresponding to an upper mirror 32 in moving mirror unit 30 (to be described below). The image of the sheet 51 on the object 50 will be formed on the focusing surface of the sensor 22 via the fixed mirror 6, moving mirror unit 30 and lens 21.

The moving mirror unit 30 is composed of a pair of mirrors 31 and 32 whose reflecting surfaces 31A and 32A face each other at an angle of 90 degrees and which are vertically fixed within a movable frame 33. Due to this arrangement, rays of light that are reflected from one mirror (31 or 32) and thence reflected by the other mirror (32 or 31) will exit from the mirror unit 30 parallel to the direction of incidence but in an opposite direction.

The movable frame 33 is fitted slidably to guide rails that are secured horizontally to the frame or chassis of the apparatus (not shown) or a bracket, etc., in such a way that it is movable horizontally (i.e., parallel both to the direction in Which the object 50 is conveyed and to the sheet 51).

The fixed mirror 6 is positioned above a given point on the conveyor 10, with its reflecting surface 6A being tilted by 45 degrees so that it faces downward. The vertical position of the fixed mirror 6 corresponds to that of the lower mirror 31 in the moving mirror unit 30. Thus, when the information indicating sheet 51 on the object 50 lies below the fixed mirror 6, the light beam from sheet 51 will be reflected first by the fixed mirror 6, then by the lower mirror 31 in moving mirror unit 30 and finally by the upper mirror 32 in mirror unit 30 to be projected into the camera section 20.

If the object 50 being conveyed varies in size (in height in the example under consideration) to cause a change in the distance from the sheet 51 to the camera section 20, the moving mirror unit 30 will be moved horizontally so that the distance from the sheet 51 to the camera section 20 is held constant to "focus" or properly form the image of the sheet 51 on the sensor 22 in the camera section 20.

In the structure described above, two optical paths, opposite in direction, are formed between the fixed mirror 6 and the camera section 20 via the moving mirror unit 30. Thus, the distance moved by the mirror unit 30 to achieve focusing is only one half the amount by which the position of the top surface (i.e., sheet 51) of the object 50 changes. For example, if the position of the top surface of the object 50 changes by an amount H (i.e., when the difference between the heights of two adjacent object is H), the amount of movement L of the mirror unit 30 is:

$$L = H/2$$

As a further advantage, mirrors 31 and 32 in the moving mirror unit 30 face each other with an angle of 90 degrees being formed between their reflecting surfaces.

Thus, optical path of incident light into the mirror unit 30 and that of outgoing light will always be parallel even if the mirror unit 30 is tilted as a whole. Thus, the moving mechanism of the moving mirror unit 30 does not require high structural precision and can be fabricated with ease.

The mirror unit 30 may be driven using the following mechanism. The optical path bending section is controlled to be movable by such means as a pulse motor, and an instrument located above the conveyor 10 for determining the position of the top surface of the object 50 delivers an output of measurement to perform automatic driving of the mirror unit 30. The lens 21 in the camera section 20 has a predetermined depth of focus, so that the operator may manually drive the mirror unit 30 on the basis of visual measurement of the size (height) of object 50 being conveyed if the measured value is within the precision of said depth of focus.

In order to ensure that the necessary information is read in a precise and consistent manner, a predetermined level of illuminance must be provided on the information indicating surface (sheet 51). However, if the absolute position of the information indicating surface (sheet 51) varies as in the case under consideration, a fixed illuminating device will not provide a constant level of illuminance since the distance between the illuminating device and the sheet 51 will vary. To deal with this problem, an illuminating section indicated by reference numeral 40 in FIG. 1 is inserted into the optical path from the sheet 51 to the camera section 20.

As mentioned above, illuminating device 40 is inserted into the optical path between the sheet 51 and camera section 20 (i.e., between the upper mirror 32 in the moving mirror unit 30 and the camera section 20), with a half mirror 41 being interposed at an angle of 45 degrees with respect to the optical path and with a lamp 42 being fixed ahead of the bent optical path created by half mirror 41. With this optical arrangement, the illuminating light from the lamp 42 is reflected by the half mirror 41 and passes through the movable mirror unit 30 and the fixed mirror 6 to be incident on the sheet 51 to illuminate its top surface. Thus, the optical path of the illuminating light coincides with that of the reading light and the distance from the lamp 42 to the sheet 51 will always be held constant by the focusing operation involving the movement of mirror unit 30. Thus, the illumination of the surface of sheet 51 is kept constant to insure information reading in a consistent and precise manner.

Figure 2:
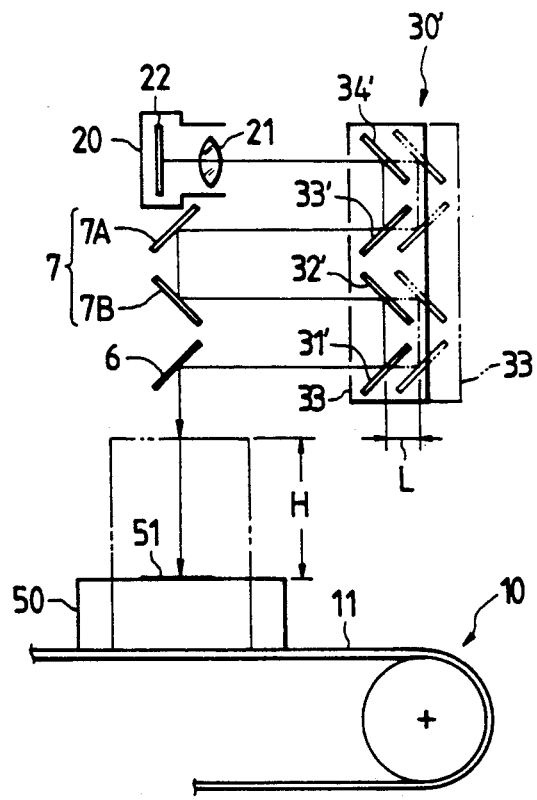
FIG. 2 is a diagram showing the concept of a focusing structure according to a second embodiment of the present invention.

FIG. 2 shows a second embodiment of the present invention, in which components that perform the same functions as those shown in connection with the first embodiment are identified by like numerals. The major difference from the first embodiment is that the moving mirror unit 30' is composed of four mirrors 31', 32', 33' and 34' in two pairs. Stated more specifically, two stages of the moving mirror unit 30 used in the first embodiment are stacked in the second embodiment, with a pair of fixed mirrors 7 (7A, 7B) being disposed at an angle of 90 degrees so that they face the two center mirrors 33' and 32' to couple respective optical paths. In the structure described above, four optical paths, two of them being opposite in direction with respect to the two others, are formed between the fixed mirror 6 and the camera section 20 via the moving mirror unit 30 and the fixed mirror pair 7. Hence, if the position of the top surface of the object 50 (i.e., the position of the sheet 51)

changes by an amount of H, the amount of movement L of the mirror unit 30 need be a quarter of H (L=H/4).

In the embodiments described above, the fixed mirror 6 is used to provide a horizontal optical path and at the same time, the mirror unit 30 is adapted to be movable horizontally. If desired, the fixed mirror 6 may be omitted, with the mirror unit 30 being adapted to be movable not only in a horizontal direction but also in a vertical direction.

As described on the foregoing pages, the focusing structure in the information reading system of the present invention provides focusing without moving the camera section which is preferably not subjected to vibration or impact, thereby increasing the durability of the information reading system. In addition, the moving mirror unit can be moved at high speed while the optical bending section need be displaced by a minimum amount to achieve focusing. As a result, the object to be sorted can be conveyed at a sufficiently high speed to increase the efficiency of the sorting operation.

What is claimed is:

1. An information reading system which reads an upper, information indicating surface of each of a plurality of objects having differing heights and being moved on a conveyor, said information reading system comprising:
    a fixed camera section for reading said information indicating surface using rays of light, said information indicating surface being read while said object is being conveyed;
    mirror means disposed between said fixed camera section and said information indicating surface including at least one pair of reflector mirrors having reflecting surfaces which face each other at an angle of 90 degrees so that said rays of light are reflected from said fixed camera section, through said mirror means, and to said information indicating surface;
    focusing means for focusing said fixed camera section on said information indicating surface by moving said mirror means to equalize an optical path from said fixed camera section to said information reading surface of each of said objects such that an optical path from said information indicating surface of an object to said fixed camera section is substantially unchanged during reading of said information indicating surface of said object; and
    means for illuminating said information indicating surface of each of said objects with illuminating light, said illuminating means being positioned in the optical path from said information indicating surface to said fixed camera section,
    wherein an optical path of said illuminating light coincides with that of said rays of light used for reading said information indicating surface of each of said objects.

2. The information reading system claimed in claim 1, wherein said mirror means includes only one pair of reflector mirrors.

3. The information reading system claimed in claim 2, wherein said focusing means moves said mirror means a distance equal to one-half of the difference in height between a previous object and a present object being examined in order to focus said camera section on said information indicating surface of said present object.

4. The information reading system claimed in claim 1, wherein said mirror means includes two pair of reflector mirrors.

5. The information reading system claimed in claim 4, wherein said focusing means moves said mirror means a distance equal to one-quarter of the difference in height between a previous object and a present object being examined in order to focus the camera section on said information indicating surface of said present object.

6. The information reading system claimed in claim 1, wherein said focusing means moves said mirror means in a direction parallel to the direction of the light rays entering and exiting the mirror means.

7. The information reading system claimed in claim 1, wherein said mirror means includes N pair of reflector mirrors (N being an integer greater than or equal to one) and said focusing means moves said mirror means a distance L satisfying the equation:

$$L = \frac{H}{2N}$$

wherein H is the difference in height between a previous object and a present object being examined in order to focus said camera section on said information indicating surface of said present object.

8. An information reading system for reading information from upper surfaces of objects having differing heights and being conveyed, said system reading said information from said surfaces with rays of light, said system comprising:
    a camera having an optical path extending between said camera and each of said upper surfaces;
    focussing means for focussing said camera on said upper surfaces, said surfaces being read while said objects are being conveyed and said focusing means comprising mirror means disposed in said optical path and receiving entrance light in a first direction while providing exit light in a second direction opposite and parallel to said first direction, said mirror means being movable in said first and second directions to vary the effective length of said optical path without moving said camera to equalize said optical path from said camera to an upper surface of each of said objects such that said optical path from said camera to said upper surface of each of said objects being focussed upon is substantially unchanged during focussing on said surface; and
    means for illuminating said upper surface of each of said objects with illuminating light, said illuminating mans being positioned in the optical path from said upper surface to said camera,
    wherein an optical path of said illuminating light coincides with that of said rays of light used for reading said upper surface of each of said objects.

9. The information reading system claimed in claim 8, wherein said mirror means reverses the direction of said optical path N times, where N is an integer, and said mirror means is moved a distance of L/2N to change the length of said optical path by a distance L.

10. The information reading system claimed in claim 8, wherein said mirror means includes two mirrors angled by 90° with respect to one another.

11. The information reading system claimed in claim 10, wherein said objects are movable along a conveyor and wherein said two mirrors are movable substantially parallel to a direction of movement of said objects on said conveyor.

* * * * *